US009562706B2

(12) United States Patent
Mun et al.

(10) Patent No.: US 9,562,706 B2
(45) Date of Patent: Feb. 7, 2017

(54) MAGNETIC COOLING APPARATUS

(71) Applicant: SAMSUNG ELECTRONICS CO., LTD., Suwon-si (KR)

(72) Inventors: Il Ju Mun, Suwon (KR); Keon Kuk, Yongin (KR); Min Soo Kim, Seoul (KR); Woo Hyek Choi, Yongin (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 495 days.

(21) Appl. No.: 13/845,915

(22) Filed: Mar. 18, 2013

(65) Prior Publication Data

US 2013/0247588 A1    Sep. 26, 2013

(30) Foreign Application Priority Data

Mar. 26, 2012  (KR) .................. 10-2012-0030455

(51) Int. Cl.
    *F25B 21/00*    (2006.01)

(52) U.S. Cl.
    CPC .......... *F25B 21/00* (2013.01); *F25B 2321/002* (2013.01); *F25B 2321/0021* (2013.01); *F25B 2321/0022* (2013.01); *Y02B 30/66* (2013.01)

(58) Field of Classification Search
    CPC ............... F25B 21/00; F25B 2321/002; F25B 2321/0022; Y02B 30/66
    USPC .............................................. 62/3.1, 3.2, 3.3
    See application file for complete search history.

(56) References Cited

U.S. PATENT DOCUMENTS

| 8,037,692 | B2* | 10/2011 | Muller et al. ................... 62/3.1 |
| 2002/0053209 | A1 | 5/2002 | Zimm et al. |
| 2004/0231338 | A1* | 11/2004 | Saito et al. ..................... 62/3.1 |
| 2008/0314049 | A1 | 12/2008 | Shin et al. |
| 2009/0266083 | A1 | 10/2009 | Shin et al. |
| 2009/0308079 | A1 | 12/2009 | Lee |
| 2010/0293966 | A1* | 11/2010 | Yokomachi et al. ............ 62/3.2 |
| 2011/0314836 | A1* | 12/2011 | Heitzler et al. ................. 62/3.1 |

OTHER PUBLICATIONS

Extended European Search Report issued Jul. 24, 2013 in corresponding European Application No. 13160870.5.

* cited by examiner

*Primary Examiner* — M. Alexandra Elve
*Assistant Examiner* — Joel Attey
(74) *Attorney, Agent, or Firm* — Staas & Halsey LLP (57) ABSTRACT

A magnetic cooling apparatus having an improved structure in which effective heat exchange may be performed by a heat transfer fluid is provided. The magnetic cooling apparatus includes a magnetic regenerator allowing a heat transfer fluid to pass therethrough and a magnetocaloric material, a magnet to apply a magnetic field to the magnetic regenerator, and a high temperature heat exchanger allowing heat to be dissipated by the heat transfer fluid containing heat received from the magnetic regenerator. The magnetic cooling apparatus includes a low temperature heat exchanger allowing heat to be absorbed by the heat transfer fluid, a pipe to connect the magnetic regenerator, high temperature heat exchanger and low temperature heat exchanger such that the heat transfer fluid circulates through the magnetic regenerator, high temperature heat exchanger and low temperature heat exchanger, and a fluid transport unit to circulate or reciprocate the heat transfer fluid.

7 Claims, 9 Drawing Sheets

ABSTRACT

MAGNETIC COOLING APPARATUS

CROSS-REFERENCE TO RELATED APPLICATIONS

This application is related to, and claims priority to, Korean Patent Application No. 10-2012-0030455, filed on Mar. 26, 2012 in the Korean Intellectual Property Office, the disclosure of which is incorporated herein by reference.

BACKGROUND

1. Field

Embodiments of the present invention relate to a cooling apparatus using a magnetocaloric material.

2. Description of the Related Art

A magnetic cooling apparatus, which uses properties of a magnetocaloric material whose temperature rises when a magnetic field is applied thereto, and decreases when the applied magnetic field is removed, is a type of cooling apparatus that may replace some conventional cooling apparatuses that use an air compression cycle.

The magnetic cooling apparatus generally includes a magnetic regenerator provided with a magnetocaloric material, a magnet to apply a magnetic field to the magnetic regenerator, a heat exchange unit allowing a heat transfer fluid passing through the magnetic regenerator to absorb heat from, or dissipate heat to, the external air, and a pipe to connect the magnetic regenerator with the heat exchange unit.

For the heat transfer fluid to perform heat exchange through circulation along the pipe, alternately in a first direction and a second direction opposite to the first direction, as the magnetic field of the magnet is, or is not, applied to the magnetic regenerator, the heat transfer fluid that has passed through the magnetic regenerator should reach the heat exchange unit in the first direction or second direction within one cycle. Therefore, the heat exchange unit may need to be disposed within a certain distance from the magnetic regenerator. However, the installation of the heat exchange unit may be limited by various parameters.

SUMMARY

It is an aspect of the present invention to provide a magnetic cooling apparatus having an improved structure in which effective heat exchange may be performed by a heat transfer fluid.

Additional aspects of the invention will be set forth in part in the description which follows and, in part, will be obvious from the description, or may be learned by practice of the invention.

In accordance with an aspect of the present invention, a magnetic cooling apparatus includes at least one magnetic regenerator allowing a heat transfer fluid to pass therethrough and provided with a magnetocaloric material, a magnet to apply a magnetic field to the magnetic regenerator, at least one high temperature heat exchanger allowing heat to be dissipated by the heat transfer fluid containing heat received from the magnetic regenerator subject to the magnetic field of the magnet applied thereto, at least one low temperature heat exchanger allowing heat to be absorbed by the heat transfer fluid that has transferred heat to the magnetic regenerator from which the magnetic field of the magnet has been removed, a pipe to connect the magnetic regenerator, the high temperature heat exchanger and the low temperature heat exchanger such that the heat transfer fluid circulates through the magnetic regenerator, the high temperature heat exchanger and the low temperature heat exchanger, and a fluid transport unit to circulate or reciprocate the heat transfer fluid through the pipe, wherein the low temperature heat exchanger is disposed such that a distance of flow of the heat transfer fluid between an outlet of the magnetic regenerator from which the magnetic field of the magnet has been removed and an outlet of the low temperature heat exchanger is equal to, or shorter than, an effective heat exchange distance (S) determined according to the following equation in order that the heat transfer fluid effectively absorbs heat upon arriving at the low temperature heat exchanger after transferring heat to the magnetic regenerator from which the magnetic field of the magnet has been removed:

$$S = (U \times mMCM \times cp\_MCM)/(\rho \times A \times cp\_fluid),$$

and $$U = (m'flow \times cp\_fluid \times tflow)/(mMCM \times cp\_MCM),$$

where $0 < U < 2$,
$A = D2\pi/4$, and
$tflow = 1/2\, fHz$, where m'flow is a mass flow rate of the heat transfer fluid (g/sec),
cp_fluid is specific heat of the heat transfer fluid (J/Kg·K),
tflow is time taken to supply fluid (sec),
mMCM is mass of the magnetocaloric material (g),
cp_MCM is specific heat of the magnetocaloric material (J/Kg·K),
A is a cross-sectional area of the pipe (cm$^2$),
D is a diameter of the pipe (cm),
$\rho$ is a density of the heat transfer fluid (g/cm$^3$), and
fHz is a driving frequency of the magnet (Hz).

The fluid transport unit may be configured to circulate the heat transfer fluid in a first direction if the magnet applies the magnetic field thereof to the magnetic regenerator, and circulate the heat transfer fluid in a second direction opposite to the first direction if the magnetic field of the magnet applied to the magnetic regenerator is removed.

The distance of flow of the heat transfer fluid between the outlet of the magnetic regenerator from which the magnetic field of the magnet has been removed and the outlet of the low temperature heat exchanger may be a sum of a length of a portion of the pipe connecting the outlet of the magnetic regenerator with an inlet of the low temperature heat exchanger and a length of flow of the heat transfer fluid in the low temperature heat exchanger between the inlet and outlet of the low temperature heat exchanger.

In accordance with an aspect of the present invention, a magnetic cooling apparatus includes a first magnetic regenerator and a second magnetic regenerator allowing a heat transfer fluid to pass therethrough and provided with a magnetocaloric material, a magnet to apply a magnetic field to the first magnetic regenerator and the second magnetic regenerator, at least one high temperature heat exchanger allowing heat to be dissipated by the heat transfer fluid containing heat received from one of the first magnetic regenerator and the second magnetic regenerator subject to the magnetic field of the magnet applied thereto, at least one low temperature heat exchanger allowing heat to be absorbed by the heat transfer fluid that has transferred heat to one of the first magnetic regenerator and second magnetic regenerator from which the magnetic field of the magnet has been removed, a pipe to connect the first magnetic regenerator, the second magnetic regenerator, the high temperature heat exchanger and the low temperature heat exchanger such that the heat transfer fluid circulates through the first magnetic regenerator, the second magnetic regenerator, the high temperature heat exchanger and the low temperature heat exchanger, a fluid transport unit to circulate or reciprocate the heat transfer fluid through the pipe, a valve unit arranged between the first magnetic regenerator and the second magnetic regenerator and the low temperature heat exchanger to guide flow of the heat transfer fluid that has transferred heat to one of the first magnetic regenerator and the second magnetic regenerator from which the magnetic field of the magnet has been removed into the low temperature heat exchanger, wherein the valve unit is disposed such that a distance of flow of the heat transfer fluid between an outlet of the one of the first magnetic regenerator and the second magnetic regenerator from which the magnetic field of the magnet has been removed and an outlet of the valve unit is equal to, or shorter than, an effective heat exchange distance (S) determined according to the following equation in order that the heat transfer fluid effectively absorbs heat upon arriving at the low temperature heat exchanger after transferring heat to the one of the first magnetic regenerator and second magnetic regenerator from which the magnetic field of the magnet has been removed:

$S = (U \times mMCM \times cp\_MCM)/(\rho \times A \times cp\_fluid)$, and $U = (m'flow \times cp\_fluid \times tflow)/(mMCM \times cp\_MCM)$, where $0 < U < 2$,
$A = D2\pi/4$, and
$tflow = 1/2fHz$,
where m'flow is a mass flow rate of the heat transfer fluid (g/sec),
cp_fluid is specific heat of the heat transfer fluid (J/Kg·K),
tflow is time taken to supply fluid (sec),
mMCM is mass of the magnetocaloric material (g),
cp_MCM is specific heat of the magnetocaloric material (J/Kg·K),
A is a cross-sectional area of the pipe (cm$^2$),
D is a diameter of the pipe (cm),
$\rho$ is a density of the heat transfer fluid (g/cm$^3$),
fHz is a driving frequency of the magnet (Hz), and
the valve unit may include a first valve arranged between the first magnetic regenerator and the low temperature heat exchanger to guide flow of the heat transfer fluid that has transferred heat to the first magnetic regenerator into the low temperature heat exchanger if the magnetic field is applied to the first magnetic regenerator, and a second valve arranged between the second magnetic regenerator and the low temperature heat exchanger to guide flow of the heat transfer fluid that has transferred heat to the second magnetic regenerator into the low temperature heat exchanger if the magnetic field is applied to the second magnetic regenerator.

The low temperature heat exchanger may include a first low temperature heat exchanger configured to receive the heat transfer fluid flowing thereinto via the first valve, and a second low temperature heat exchanger configured to receive the heat transfer fluid flowing thereinto via the second valve.

The heat transfer fluid may be selectively directed into the first low temperature heat exchanger or the second low temperature heat exchanger by the first valve and the second valve.

The fluid transport unit may be configured to circulate the heat transfer fluid in a first direction if the magnetic field of the magnet is applied to the first magnetic regenerator, and circulate the heat transfer fluid in a second direction opposite to the first direction if the magnetic field of the magnet is applied to the second magnetic regenerator.

The high temperature heat exchanger and the low temperature heat exchanger may be disposed at opposite positions in a circulation path of the heat transfer fluid with the first magnetic regenerator and the second magnetic regenerator arranged therebetween.

The valve unit may be a 3-way valve.

The at least one high temperature heat exchanger may include a first high temperature heat exchanger, the heat transfer fluid flowing thereinto after receiving heat from the first magnetic regenerator, and a second high temperature heat exchanger, the heat transfer fluid flowing thereinto after receiving heat from the second magnetic regenerator.

The magnetic cooling apparatus may further include at least one third valve arranged between the first and second magnetic regenerators and the high temperature heat exchanger to allow flow of the heat transfer fluid containing heat received from one of the first magnetic regenerator and second magnetic regenerator subject to the magnetic field of the magnet into the high temperature heat exchanger.

BRIEF DESCRIPTION OF THE DRAWINGS

These and/or other aspects of the invention will become apparent and more readily appreciated from the following description of the embodiments, taken in conjunction with the accompanying drawings of which.

DETAILED DESCRIPTION

Reference will now be made in detail to the embodiments of the present invention, examples of which are illustrated in the accompanying drawings, wherein like reference numerals refer to like elements throughout.

Figure 1:
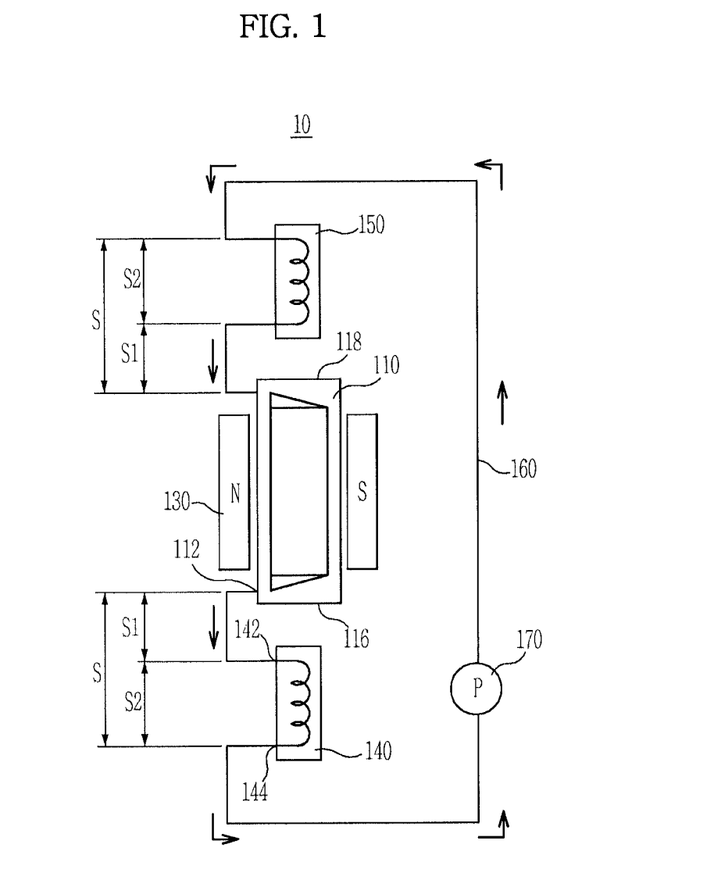
FIGS. 1 and 2 illustrate a magnetic cooling apparatus according to an exemplary embodiment of the present invention.
Figure 2:
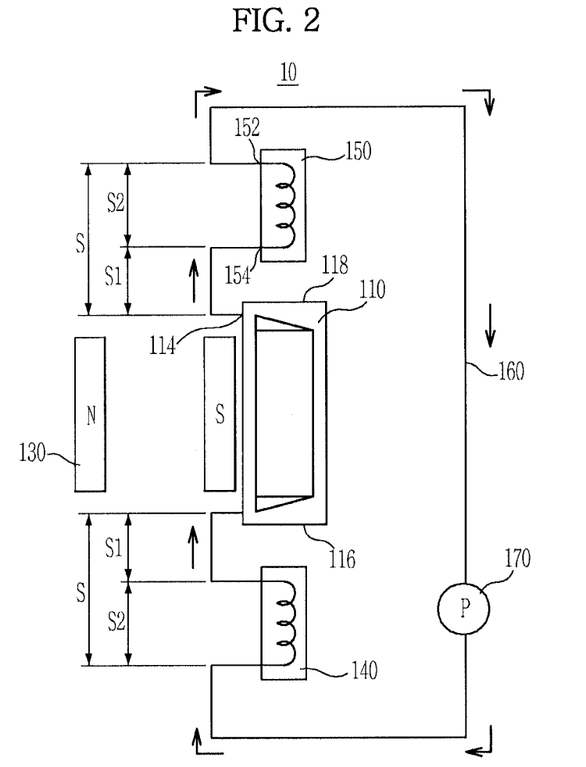
Figure 9:
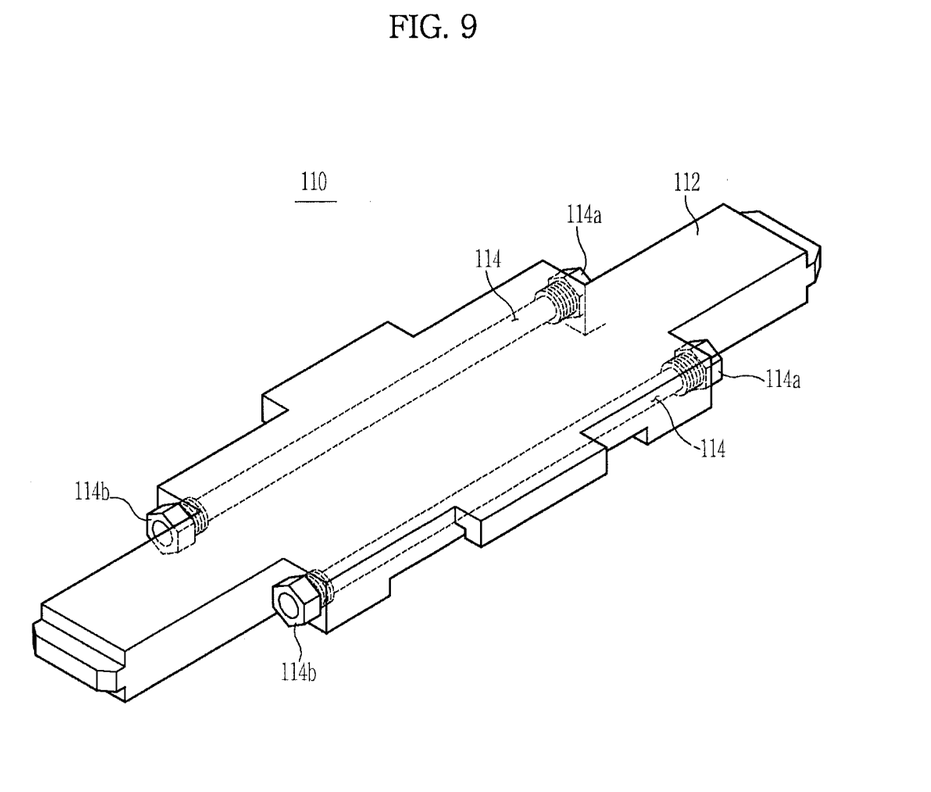
FIG. 9 illustrates a magnetic regenerator according to an embodiment of the present invention.

FIGS. 1 and 2 illustrate a magnetic cooling apparatus according to an exemplary embodiment of the present invention, and FIG. 9 illustrates an exemplary magnetic regenerator according to an exemplary embodiment of the present invention.

As illustrated in FIGS. 1, 2 and 9, the magnetic cooling apparatus 10 includes a magnetic regenerator 110 allowing a heat transfer fluid to pass therethrough and provided with a magnetocaloric material, a magnet 130 to apply a magnetic field to the magnetic regenerator 110, and a high temperature heat exchanger 140, the heat transfer fluid flowing thereinto to dissipate heat after receiving heat from the magnetic regenerator 110 subject to the magnetic field of the magnet 130. The magnetic cooling apparatus includes a low temperature heat exchanger 150, the heat transfer fluid flowing thereinto to absorb heat after transferring heat to the magnetic regenerator 110 with the magnetic field of the magnet 130 removed from the magnetic regenerator 110, a connector, e.g., pipe 160 to connect the magnetic regenerator 110, the high temperature heat exchanger 140 and the low temperature heat exchanger 150 such that the heat transfer fluid circulates back and forth through the magnetic regenerator 110, the high temperature heat exchanger 140 and the low temperature heat exchanger 150. The magnetic cooling apparatus includes a fluid transport unit 170 to drive the heat transfer fluid to circulate or move back and forth along the pipe 160.

Heat transfer fluids that may be used in the magnetic cooling apparatus 10 include water, antifreeze such as alcohol and ethylene glycol, and helium gas. A mixture of the fluids may be used as a heat transfer fluid.

As illustrated in FIG. 9, the magnetic regenerator 110 includes a body 112 and a through hole 114 formed in a longitudinal direction of the body 112. The body 112 may be formed of a material such as plastic that provides good insulation. The through hole 114 may be filled with a magnetocaloric material.

The temperature of a magnetocaloric material changes according to application of a magnetic field thereto (which is referred to as the magnetocaloric effect). Materials that may produce a strong magnetocaloric effect include gadolinium, manganese iron compounds (MnFe) and lanthanum iron compounds (LaFe) which are fine powders. Such magnetocaloric materials have pores having high permeability for flow of the heat transfer fluid, and have high capacity to absorb and dissipate heat. Both ends of the through hole 114 may be coupled to connectors 114a and 114b. The connectors 114a and 114b allow the magnetic regenerator 110 to be connected with the high temperature heat exchanger 140 and low temperature heat exchanger 150 through the pipe 160 such that the heat transfer fluid flows through the magnetic regenerator 110 into the high temperature heat exchanger 140 or the low temperature heat exchanger 150. The heat transfer fluid flows into the through hole 114, contacting the magnetocaloric material to absorb heat generated by the magnetocaloric material or to dissipate heat to the magnetocaloric material. When a magnetic field is applied to the magnetic regenerator 110, the heat transfer fluid absorbs heat generated by the magnetocaloric material and flows into the high temperature heat exchanger 140 to dissipate heat thereto. When the magnetic field applied to the magnetic regenerator 110 is removed, the heat transfer fluid that has lost heat to the magnetocaloric material flows into the low temperature heat exchanger 150 to absorb heat.

The magnet 130, which has a pair of north (N) and south (S) poles, may be movably arranged to apply a magnetic field to, and remove the magnetic field from, the magnetic regenerator 110.

Although not shown in FIGS. 1, 2 and 9, the magnetic regenerator 110 may be arranged to move into, and withdraw from, the magnetic field created by the magnet 130, with the magnet 130 fixed. This structure may be realized, for example, by allowing the magnetic regenerator 110 to reciprocate or rotate.

The low temperature heat exchanger 150 and the high temperature heat exchanger 140 may be disposed at opposite positions in a circulation path of the heat transfer fluid with the magnetic regenerator 110 disposed therebetween.

The magnetic cooling apparatus 10 may be used to heat a room through heat dissipation at the high temperature heat exchanger 140 or cool the room through heat absorption at the low temperature heat exchanger 150.

The fluid transport unit 170 may be disposed in the circulation path of the heat transfer fluid to circulate the heat transfer fluid in the forward or reverse direction. That is, if the magnet 130 is moved toward the magnetic regenerator 110 to apply a magnetic field to the magnetic regenerator 110, the fluid transport unit 170 allows the heat transfer fluid to circulate counterclockwise as illustrated in FIG. 1, such that the heat transfer fluid receives heat transferred from the magnetic regenerator 110 and flows directly into the high temperature heat exchanger 140. If the magnet 130 is moved away from the magnetic regenerator 110 to remove the magnetic field applied to the magnetic regenerator 110, the fluid transport unit 170 allows the heat transfer fluid to circulate clockwise as illustrated in FIG. 2, such that the heat transfer fluid transfers heat to the magnetic regenerator 110 and flows directly into the low temperature heat exchanger 150.

Although not illustrated in FIGS. 1, 2 and 9, the fluid transport unit 170, which diverts the direction of circulation of the heat transfer fluid, may be a displacer or a combination of a pump to generate flow and a valve to divert the direction of flow.

A description is provided of how the heat transfer fluid dissipates heat to the surroundings and absorbs heat from the surroundings, while circulating through the magnetic regenerator 110, high temperature heat exchanger 140 and low temperature heat exchanger 150.

As illustrated in FIG. 1, if the magnet 130 is moved toward the magnetic regenerator 110 to apply a magnetic field to the magnetic regenerator 110, the heat transfer fluid may be circulated counterclockwise by the fluid transport unit 170. The heat transfer fluid flowing into the magnetic regenerator 110 absorbs heat generated by the magnetic regenerator 110 subject to the magnetic field, and dissipates the heat absorbed from the magnetic regenerator 110 to the surroundings when it reaches the high temperature heat exchanger 140. After dissipating the heat to the surroundings at the high temperature heat exchanger 140, the heat transfer fluid flows into the magnetic regenerator 110 via the low temperature heat exchanger 150.

As illustrated in FIG. 2, if the magnet 130 is moved away from the magnetic regenerator 110 to remove the magnetic field applied to the magnetic regenerator 110, the heat transfer fluid may be circulated clockwise by the fluid transport unit 170. The heat transfer fluid flowing into the magnetic regenerator 110 transfers heat to the magnetic regenerator 110 which is not subject to the magnetic field anymore, reaches the low temperature heat exchanger 150 in a cold state and absorbs heat from the surroundings. After absorbing heat from the surroundings at the low temperature heat exchanger 150, the heat transfer fluid flows into the magnetic regenerator 110 via the high temperature heat exchanger 140. Through this operation, the heat transfer fluid completes one heat exchange cycle. A high or low temperature demanded for a room is obtained by repeating this heat exchange cycle.

Formed at both ends 116 and 118 of the magnetic regenerator 110 are a hot-side which the heat transfer fluid enters and leaves at a relatively high temperature and a cold-side which the heat transfer fluid enters and leaves at a relatively low temperature.

Since the heat transfer fluid perform the heat exchange operation by circulating alternately counterclockwise and clockwise according to a magnetic field of the magnet 130 applied to, or removed from, the magnetic regenerator 110, the heat transfer fluid should be allowed to reach the high temperature heat exchanger 140 or low temperature heat exchanger 150 within the time for half the heat exchange cycle after passing through the magnetic regenerator 110 to ensure effective heat exchange at the high temperature heat exchanger 140 or low temperature heat exchanger 150. The high temperature heat exchanger 140 or low temperature heat exchanger 150 may be disposed within a certain distance from the magnetic regenerator 110. The distance of heat transfer fluid flow between the magnetic regenerator 110 and the high temperature heat exchanger 140 or low temperature heat exchanger 150 that ensures effective heat exchange at the high temperature heat exchanger 140 or low temperature heat exchanger 150 may be defined as an effective heat exchange distance (S).

That is, as illustrated in FIG. 1, for effective heat exchange to occur at the high temperature heat exchanger 140, the distance of flow of the heat transfer fluid between the outlet 112 of the magnetic regenerator 110 subject to the magnetic field of the magnet 130 and the outlet 144 of the high temperature heat exchanger 140 needs to be equal to, or less than, the effective heat exchange distance (S). The distance of flow of the heat transfer fluid between the outlet 112 of the magnetic regenerator 110 subject to the magnetic field of the magnet 130 and the outlet 144 of the high temperature heat exchanger 140 is equal to the sum of the length (S1) of a portion of the pipe 160 connecting the outlet 112 of the magnetic regenerator 110 with the inlet 142 of the high temperature heat exchanger 140 and the length (S2) of another portion of the pipe 160 in the high temperature heat exchanger 140 between the inlet 142 and outlet 144 of the high temperature heat exchanger 140 through which the heat transfer fluid flows.

As illustrated in FIG. 2, for effective heat exchange to occur at the low temperature heat exchanger 150, the distance of flow of the heat transfer fluid between the outlet 114 of the magnetic regenerator 110 from which the magnetic field of the magnet 130 has been removed and the outlet 154 of the low temperature heat exchanger 150 needs to be equal to, or shorter than, the effective heat exchange distance (S). The distance of flow of the heat transfer fluid between the outlet 114 of the magnetic regenerator 110 from which the magnetic field of the magnet 130 has been removed and the outlet 154 of the low temperature heat exchanger 150 is equal to the sum of the length (S1) of a portion of the pipe 160 connecting the outlet 114 of the magnetic regenerator 110 with the inlet 152 of the low temperature heat exchanger 150 and the length (S2) of flow of the heat transfer fluid in the low temperature heat exchanger 150 between the inlet 152 and the outlet 154 of the low temperature heat exchanger 150.

According to an embodiment of the present invention, an effective heat exchange distance (S) may be defined as:

$$S = (U \times m_{MCM} \times c_{p\_}^{MCM}) / (\rho \times A \times c_{p\_}^{fluid}),$$

and $$U \text{ (Coefficient of performance of magnetic cooling apparatus)} = (m'_{flow} \times c_{p\_}^{fluid} \times t_{fluid}) / (m_{MCM} \times c_{p\_}^{MCM}),$$

where $0 < U < 2$,
$A = D^2 90/4$, and
$t_{flow} = 1/2 f_{Hz}$,
where $m'_{flow}$ is a mass flow rate of the heat transfer fluid (g/sec),
$c_{p\_}^{fluid}$ is specific heat of the heat transfer fluid (J/Kg·K),
$t_{flow}$ is time taken to supply fluid (sec),
$m_{MCM}$ is mass of the magnetocaloric material (g),
$c_{p\_}^{MCM}$ is specific heat of the magnetocaloric material (J/Kg·K),
A is a cross-sectional area of the pipe (cm$^2$),
D is a diameter of the pipe (cm),
$\rho$ is a density of the heat transfer fluid (g/cm$^3$), and $f_{Hz}$ is a driving frequency of the magnet 130 (Hz).

The specific heat of heat transfer fluid ($c_{p\_}^{fluid}$) is a characteristic of the heat transfer fluid. The mass ($m_{MCM}$) and specific heat ($c_{p\_}^{MCM}$) of magnetocaloric material are characteristics of a magnetocaloric material, time taken to supply fluid ($t_{flow}$) is a value determined by a predetermined driving frequency ($f_{Hz}$) of the magnet 130, and the cross-sectional area (A) of the connector (such as a pipe 160) is constant. Therefore, the effective heat exchange distance (S) may be determined by adjusting the flow rate ($m'_{flow}$) of heat transfer fluid.

By disposing the high temperature heat exchanger 140 or low temperature heat exchanger 150 within the effective heat exchange distance (S), the overall performance of heat exchange of the magnetic cooling apparatus 10 may be maintained over a certain level.

FIGS. 1 and 2 illustrate an exemplary embodiment including one magnetic regenerator 110, but embodiments of the present invention are not limited thereto. The number of the magnetic regenerators 110 to be provided is not limited to one. That is, a plurality of magnetic regenerators 110 may be provided to perform magnetic cooling. A number of the high temperature heat exchangers 140 or low temperature heat exchangers 150 and the fluid transport units 170 are not limited.

The high temperature heat exchanger 140 or low temperature heat exchanger 150 may need to be disposed beyond the effective heat exchange distance (S), depending on the installation conditions. According to an exemplary embodiment of the present invention, the high temperature heat exchanger 140 or the low temperature heat exchanger 150 may be disposed beyond the effective heat exchange distance (S). For convenience of description, similar elements as those of the magnetic cooling apparatus 10 according to the previous embodiment are not described.

Figure 3:
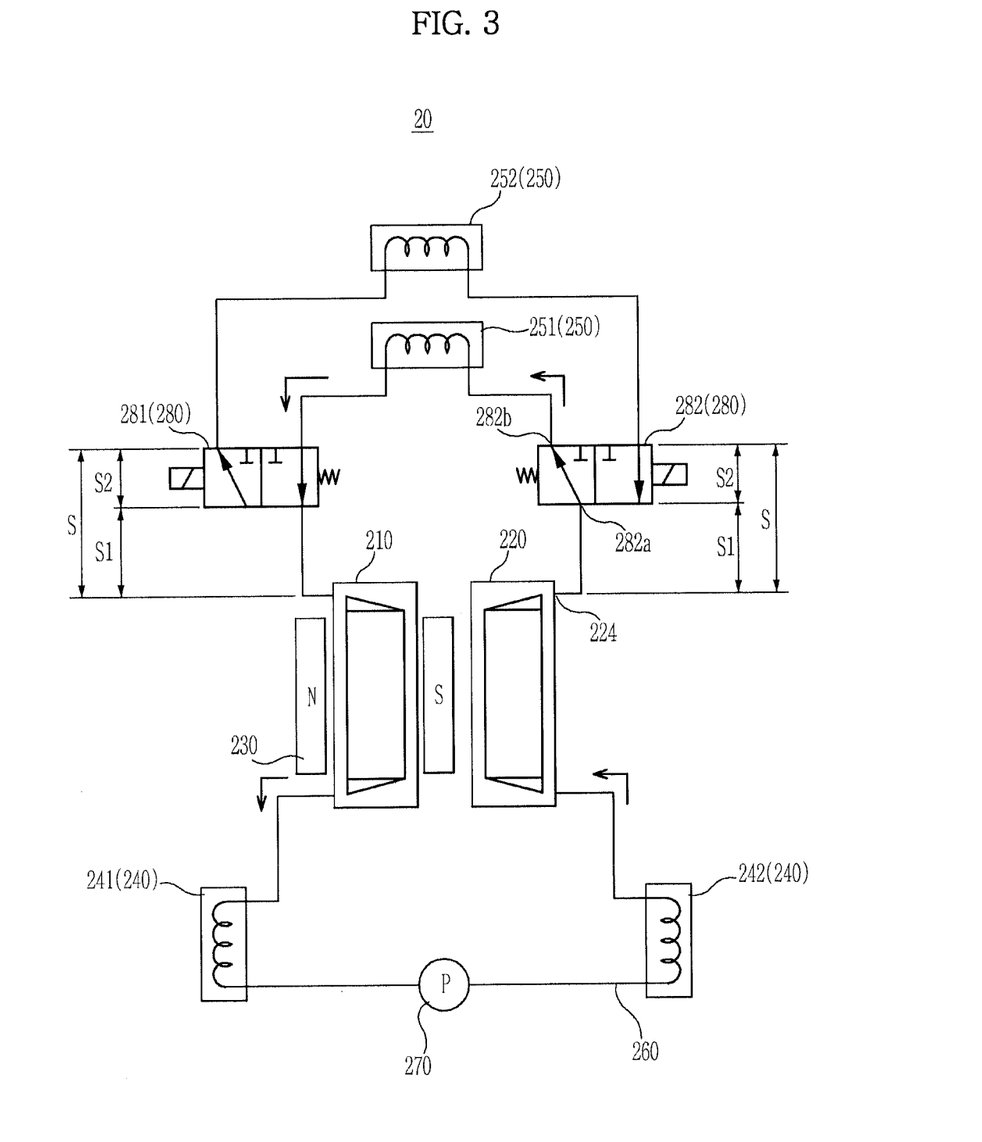
FIGS. 3 and 4 illustrate a magnetic cooling apparatus according to an embodiment of the present invention.
Figure 4:
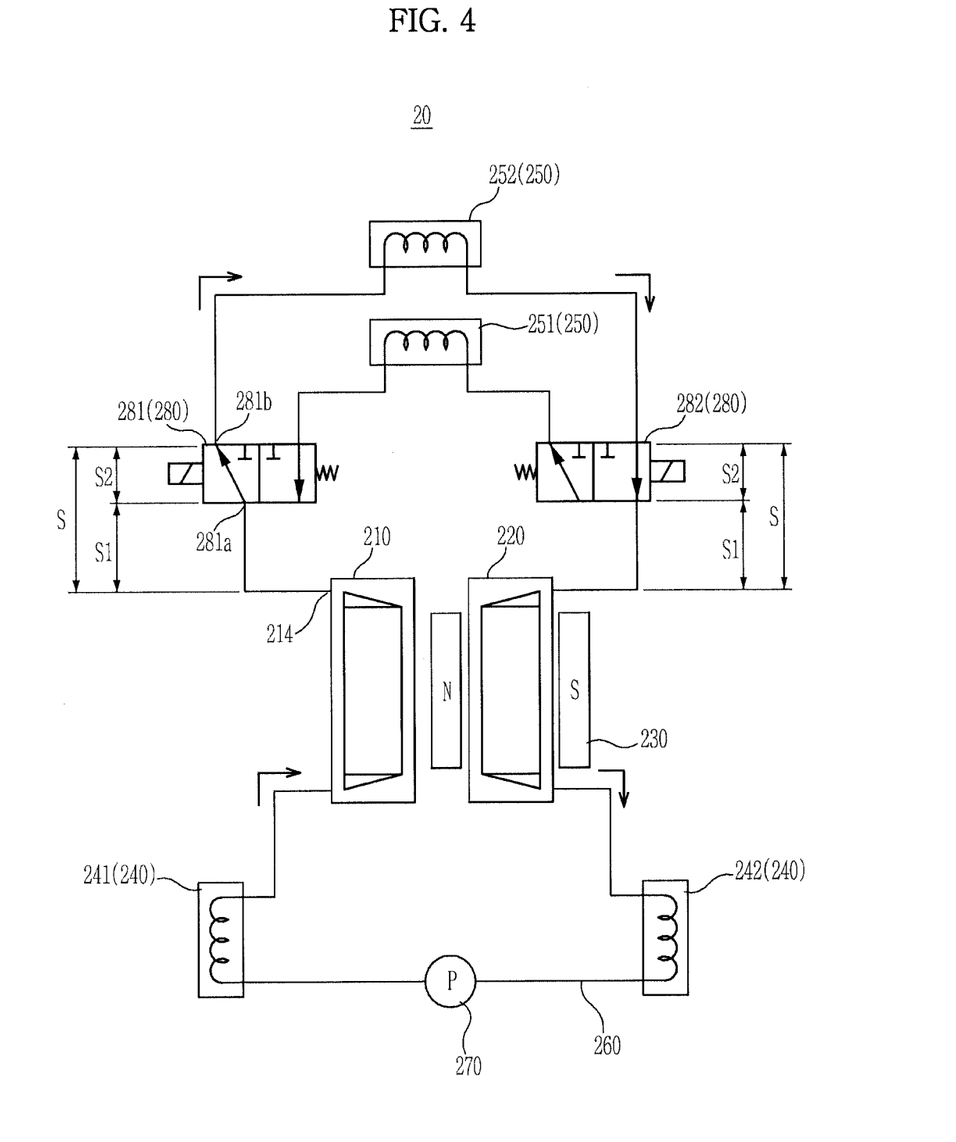

FIGS. 3 and 4 illustrate a magnetic cooling apparatus according to an embodiment of the present invention.

As illustrated in FIGS. 3 and 4, the magnetic cooling apparatus 20 includes a first magnetic regenerator 210 and a second magnetic regenerator 220 allowing a heat transfer fluid to pass therethrough and provided with a magnetocaloric material. The magnetic cooling apparatus includes a magnet 230 to selectively apply a magnetic field to the first magnetic regenerator 210 and second magnetic regenerator 220, and a high temperature heat exchanger 240 allowing the heat transfer fluid to dissipate heat received from the first magnetic regenerator 210 or second magnetic regenerator 220 subject to the magnetic field of the magnet 230. The magnetic cooling apparatus includes a low temperature heat exchanger 250 allowing heat to be absorbed by the heat transfer fluid that has transferred heat to one of the first magnetic regenerator 210 and second magnetic regenerator 220 released from the magnetic field of the magnet 230, a pipe 260 to connect the first magnetic regenerator 210, second magnetic regenerator 220, high temperature heat exchanger 240 and low temperature heat exchanger 250 to allow the heat transfer fluid to circulate and move back and forth through the first magnetic regenerator 210, second magnetic regenerator 220, high temperature heat exchanger 240 and low temperature heat exchanger 250, and a fluid transport unit 270 to divert the direction of circulation of the heat transfer fluid. The magnetic cooling apparatus includes a valve unit 280 arranged between the first magnetic regenerator 210 and second magnetic regenerator 220 and the low temperature heat exchanger 250 and allowing the heat transfer fluid that has transferred heat to one of the first magnetic regenerator 210 and second magnetic regenerator 220 released from the magnetic field of the magnet 230 to flow into the low temperature heat exchanger 250.

The high temperature heat exchanger 240 includes a first high temperature heat exchanger 241 allowing the heat transfer fluid to dissipate heat received from the first magnetic regenerator 210, and a second high temperature heat exchanger 242 allowing the heat transfer fluid to dissipate heat received from the second magnetic regenerator 220.

The low temperature heat exchanger 250 includes a first low temperature heat exchanger 251 into which the heat transfer fluid flows after passing a first valve 281, and a second low temperature heat exchanger 252 into which the heat transfer fluid flows after passing a second valve 282.

The valve unit 280, which selectively diverts the flow of the heat transfer fluid into the first low temperature heat exchanger 251 or second low temperature heat exchanger 252, includes a first valve 281 allowing the heat transfer fluid that has lost heat to the first magnetic regenerator 210 to flow into the second low temperature heat exchanger 252 when a magnetic field is applied to the second magnetic regenerator 220, and a second valve 282 allowing the heat transfer fluid that has transferred heat to the second magnetic regenerator 220 to flow into the first low temperature heat exchanger 251 when the magnetic field is applied to the first magnetic regenerator 210. The first valve 281 and second valve 282 may be 3-way valves.

If the magnetic field of the magnet 230 is applied to the first magnetic regenerator 210, the heat transfer fluid that has been cooled through the second magnetic regenerator 220 flows into the first low temperature heat exchanger 251 through the second valve 282 and absorbs heat from the surroundings, and then flows into the first magnetic regenerator 210 through the first valve 281. In this case, the heat transfer fluid does not flow into the second low temperature heat exchanger 252. If the magnetic field of the magnet 230 is applied to the second magnetic regenerator 220, the heat transfer fluid that has been cooled through the first magnetic regenerator 210 flows into the second low temperature heat exchanger 252 through the first valve 281 and absorbs heat from the surroundings, and then flows into the second magnetic regenerator 220 through the second valve 282. The heat transfer fluid does not flow into the first low temperature heat exchanger 251. Accordingly, the heat transfer fluid may be selectively directed into only one of the first low temperature heat exchanger 251 and second low temperature heat exchanger 252 by the first valve 281 and the second valve 282.

That is, when the heat transfer fluid passes the first valve 281 or second valve 282 and flows through the first low temperature heat exchanger 251 or second low temperature heat exchanger 252, it circulates along a different flow path. Therefore, arranging the first valve 281 and second valve 282 within the effective heat exchange distance (S) allows effective heat exchange even when the first low temperature heat exchanger 251 and second low temperature heat exchanger 252 are not disposed within the effective heat exchange distance (S). Arrangement of the first valve 281 within the effective heat exchange distance (S) indicates that the distance of flow of the heat transfer fluid between the outlet 214 of the first magnetic regenerator 210 released from the magnetic field of the magnet 230 and the outlet 281b of the first valve 281 should be equal to, or less than, the effective heat exchange distance (S), as in the previous embodiment. The distance of flow of the heat transfer fluid between the outlet 214 of the first magnetic regenerator 210 released from the magnetic field of the magnet 230 and the outlet 281b of the first valve 281 is the sum of the length (S1) of a portion of the pipe 260 connecting the outlet 214 of the first magnetic regenerator 210 and the inlet 281a of the first valve 281 and the length (S2) of flow of the heat transfer fluid through the first valve 281 between the inlet 281a and outlet 281b of the first valve 281.

As in the case of the first valve 281, the second valve 282 should be disposed such that the distance of flow of the heat transfer fluid between the outlet 224 of the second magnetic regenerator 220 released from the magnetic field of the magnet 230 and the outlet 282b of the second valve 282 is equal to, or less than, the effective heat exchange distance (S). The distance of flow of the heat transfer fluid between the outlet 224 of the second magnetic regenerator 220 released from the magnetic field of the magnet 230 and the outlet 282b of the second valve 282 is the sum of the length (S1) of a portion of the pipe 260 connecting the outlet 224 of the second magnetic regenerator 220 with the inlet 282a of the second valve 282, and the length (S2) of flow of the heat transfer fluid through the second valve 282 between the inlet 282a and outlet 282b of the second valve 282.

An illustrated embodiment includes two magnetic regenerators 210 and 220, but the number of magnetic regenerators 210 and 220 is not limited thereto. That is, at least one magnetic regenerator 210 and 220 may be used to perform magnetic cooling. The number of the high temperature heat exchangers 240 and the numbers of the fluid transport units 270 and valve units 280 are not limited.

As the first low temperature heat exchanger 251 and second low temperature heat exchanger 252 may be installed without regard to the effective heat exchange distance (S), the installability and convenience thereof may be enhanced.

Further, an effective installation and use of one low temperature heat exchanger 250 regardless of the effective heat exchange distance (S) may be possible.

Figure 5:
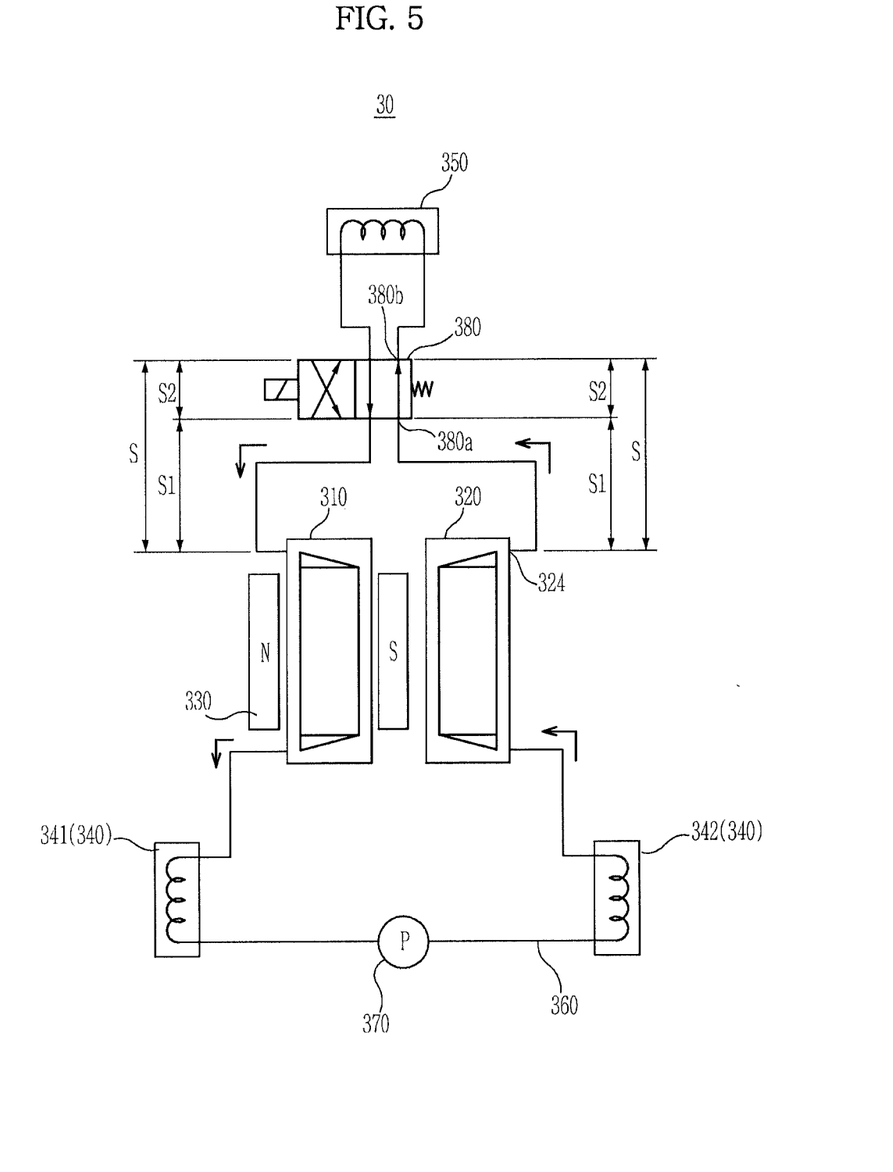
FIGS. 5 and 6 illustrate a magnetic cooling apparatus according to an embodiment of the present invention.
Figure 6:
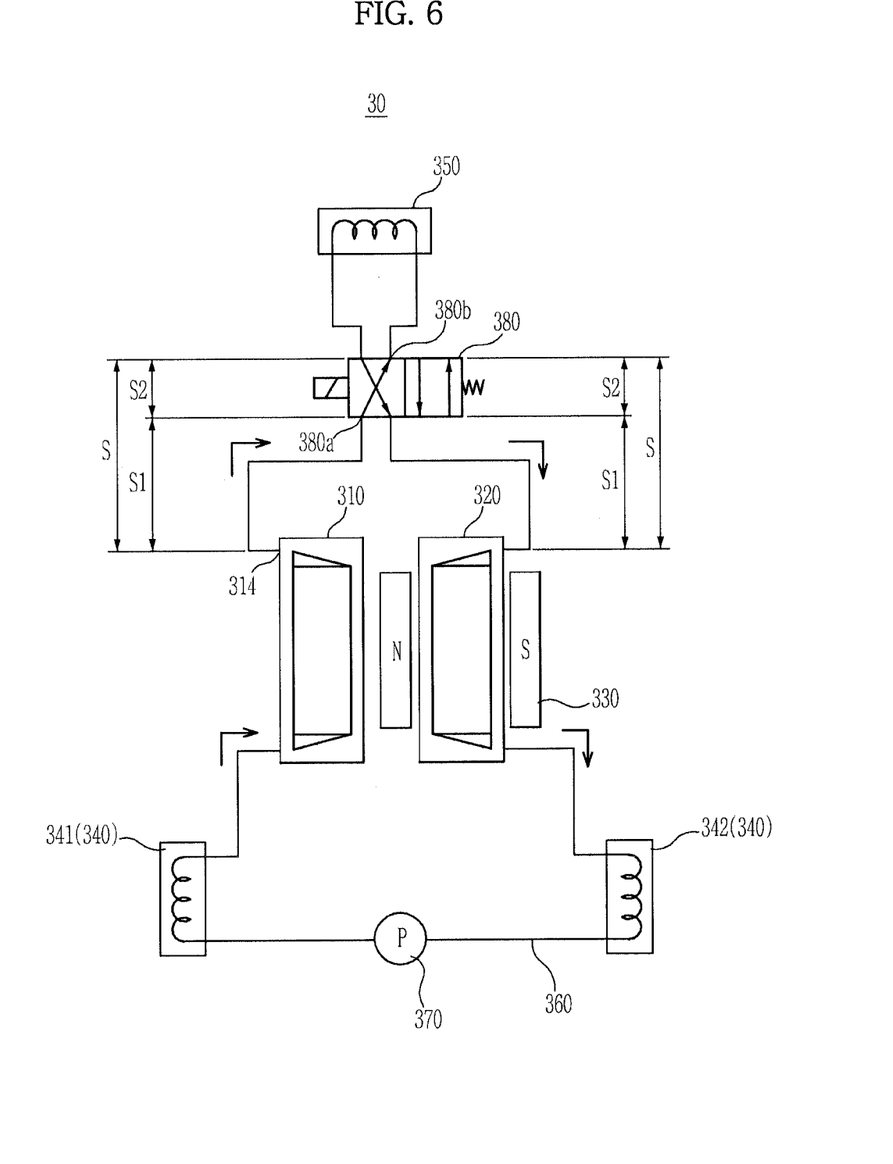

FIGS. 5 and 6 illustrate a magnetic cooling apparatus according to an embodiment of the present invention.

As illustrated in FIGS. 5 and 6, a magnetic cooling apparatus 30 includes a first magnetic regenerator 310 and a second magnetic regenerator 320 allowing a heat transfer fluid to pass therethrough and provided with a magnetocaloric material, a magnet 330 to selectively apply a magnetic field to the first magnetic regenerator 310 and the second magnetic regenerator 320. The magnetic cooling apparatus includes a high temperature heat exchanger 340 allowing the heat transfer fluid to dissipate heat received from the first magnetic regenerator 310 or second magnetic regenerator 320 subject to the magnetic field of the magnet 330, a low temperature heat exchanger 350 allowing heat to be absorbed by the heat transfer fluid that has transferred heat to one of the first magnetic regenerator 310 and the second magnetic regenerator 320 released from the magnetic field of the magnet 330, and a pipe 360 to connect the first magnetic regenerator 310, the second magnetic regenerator 320, the high temperature heat exchanger 340 and the low temperature heat exchanger 350 to allow the heat transfer fluid to circulate, and move back and forth, through the first magnetic regenerator 310, second magnetic regenerator 320, high temperature heat exchanger 340 and low temperature heat exchanger 350. The magnetic cooling apparatus includes a fluid transport unit 370 to divert the direction of circulation of the heat transfer fluid, a valve unit 380 arranged between the first magnetic regenerator 310 and second magnetic regenerator 320 and the low temperature heat exchanger 350 to allow the heat transfer fluid that has transferred heat to one of the first magnetic regenerator 310 and the second magnetic regenerator 320 released from the magnetic field of the magnet 330 to flow into the low temperature heat exchanger 350.

The high temperature heat exchanger 340 includes a first high temperature heat exchanger 341 allowing the heat transfer fluid to dissipate heat received from the first magnetic regenerator 310 thereto, and a second high temperature heat exchanger 342 allowing the heat transfer fluid to dissipate heat received from the second magnetic regenerator 320.

The valve unit 380 may be provided with a valve, e.g., a 4 Port-2 Position valve to maintain a direction in which the heat transfer fluid flows into the low temperature heat exchanger 350 after passing through the first magnetic regenerator 310 or the second magnetic regenerator 320. Regardless of which of the first magnetic regenerator 310 and the second magnetic regenerator 320 is subject to the magnetic field of the magnet 330, the heat transfer fluid is set to flow counterclockwise to pass through the low temperature heat exchanger 350 after passing the valve unit 380.

When the heat transfer fluid passes the valve unit 380 and flows through the low temperature heat exchanger 350, it circulates along a different flow path. Therefore, arranging the valve unit 380 within the effective heat exchange distance (S) would allow effective heat exchange to occur even when the low temperature heat exchanger 350 is not disposed within the effective heat exchange distance (S). Arrangement of the valve unit 380 within the effective heat exchange distance (S) indicates that the distance of flow of the heat transfer fluid between the outlet 314 of the first magnetic regenerator 310 and the outlet 380b of the valve unit 380 should be equal to, or less than, the effective heat exchange distance (S), and the distance of flow of the heat transfer fluid between the outlet 324 of the second magnetic regenerator 320 and the outlet 380b of the valve unit 380 should be equal to, or less than, the effective heat exchange distance (S). The distance of flow of the heat transfer fluid between the outlet 314 of the first magnetic regenerator 310 and the outlet 380b of the valve unit 380 is the sum of the length (S1) of a portion of the pipe 360 connecting the outlet 314 of the first magnetic regenerator 310 to the inlet 380a of the valve unit 380, and the length (S2) of flow of the heat transfer fluid through the valve unit 380 between the inlet 380a and outlet 380b of the valve unit 380. The distance of flow of the heat transfer fluid between the outlet 324 of the second magnetic regenerator 320 and the outlet 380b of the valve unit 380 is the sum of the length (S1) of a portion of the pipe 360 connecting outlet 324 of the second magnetic regenerator 320 and the inlet 380a of the valve unit 380, and the length (S2) of flow of the heat transfer fluid through the valve unit 380 between the inlet 380a and outlet 380b of the valve unit 380.

FIGS. 5 and 6 illustrate an exemplary embodiment including two magnetic regenerators 310 and 320, but the number of magnetic regenerators 310 and 320 is not limited thereto. That is, at least one magnetic regenerator 310 and 320 may be provided to perform magnetic cooling. The numbers of the high temperature heat exchangers 340, fluid transport units 370 and valve units 380 are not limited.

As the low temperature heat exchanger 350 may be installed without regard to the effective heat exchange distance (S), the installability and convenience thereof is enhanced.

Figure 7:
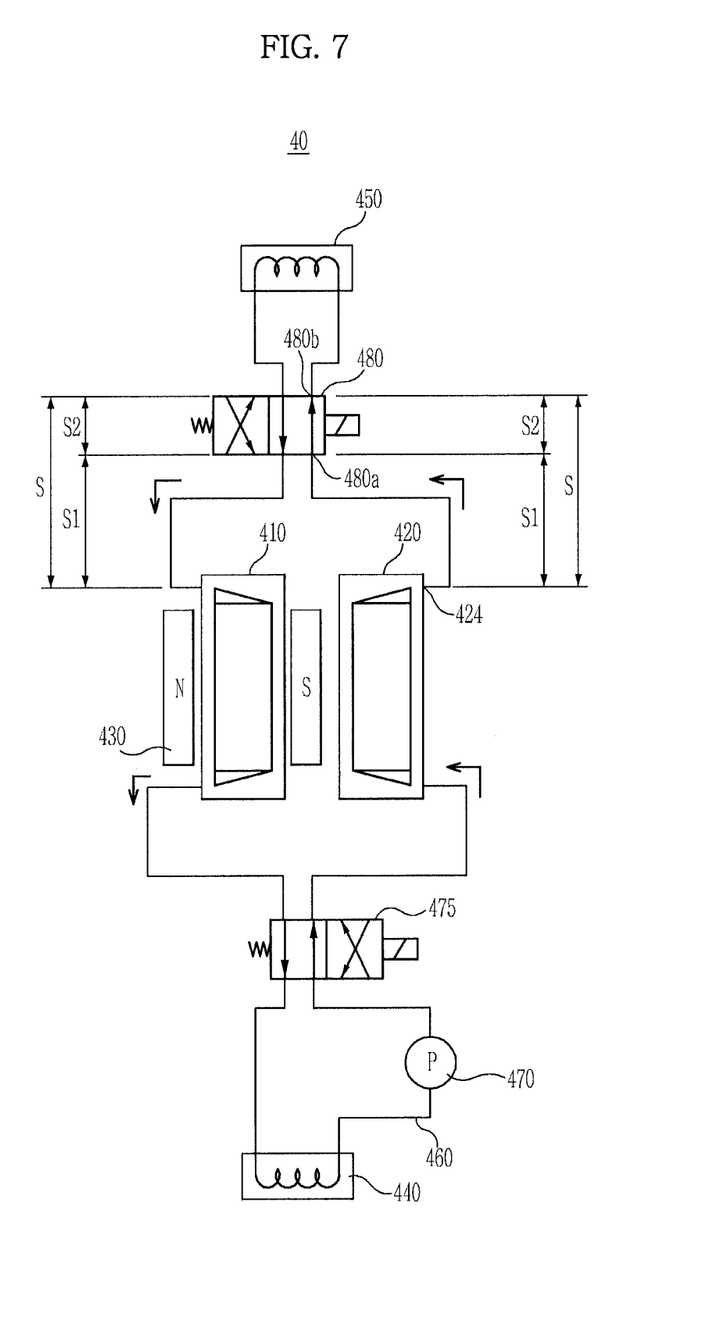
FIGS. 7 and 8 illustrate a magnetic cooling apparatus according to an embodiment of the present invention.
Figure 8:
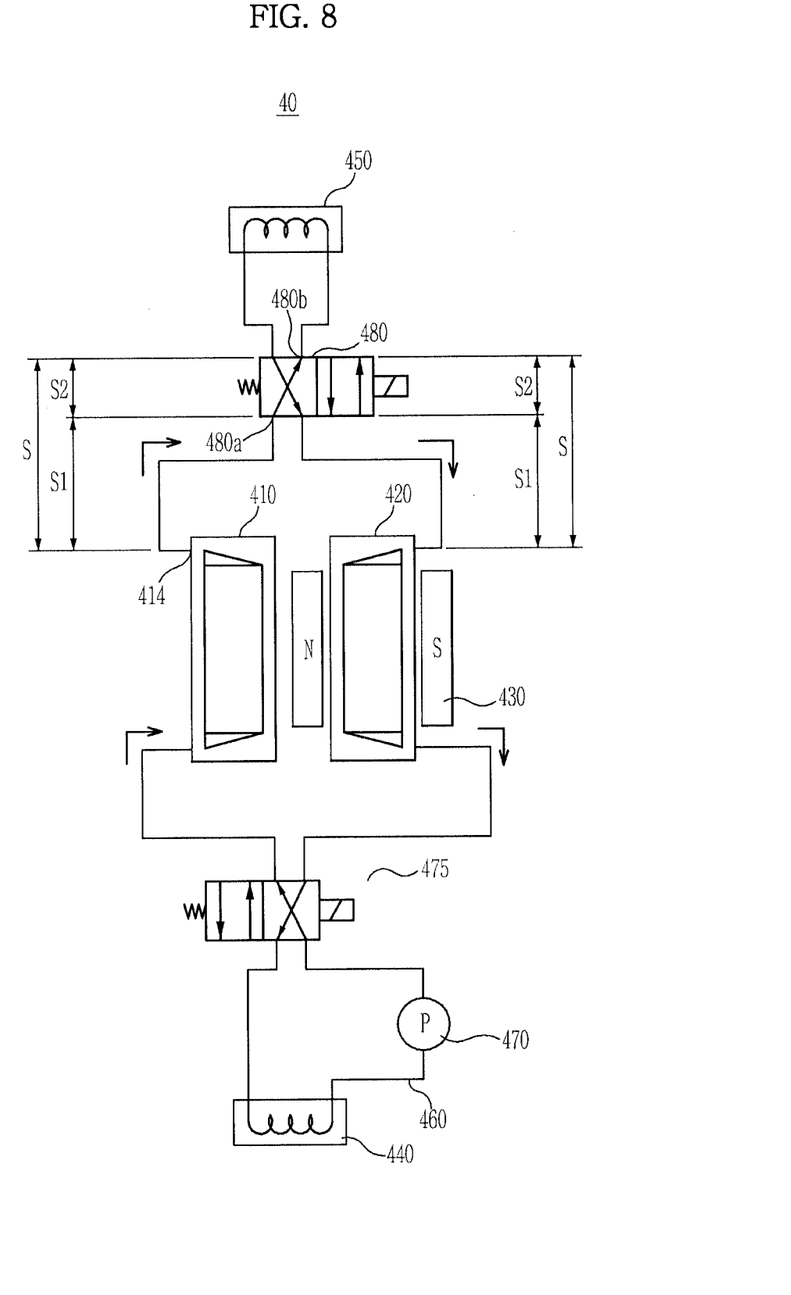

FIGS. 7 and 8 illustrate a magnetic cooling apparatus according to an exemplary embodiment of the present invention.

As illustrated in FIGS. 7 and 8, the magnetic cooling apparatus 40 includes a first magnetic regenerator 410 and a second magnetic regenerator 420 allowing a heat transfer fluid to pass therethrough and provided with a magnetocaloric material, a magnet 430 to selectively apply a magnetic field to the first magnetic regenerator 410 and second magnetic regenerator 420, and a high temperature heat exchanger 440 allowing the heat transfer fluid to dissipate heat received from the first magnetic regenerator 410 or second magnetic regenerator 420 subject to the magnetic field of the magnet 430. The magnetic cooling apparatus 40 includes a low temperature heat exchanger 450 allowing heat to be absorbed by the heat transfer fluid that has transferred heat to one of the first magnetic regenerator 410 and the second magnetic regenerator 420 released from the magnetic field of the magnet 430, and a pipe 460 to connect the first magnetic regenerator 410, the second magnetic regenerator 420, the high temperature heat exchanger 440 and the low temperature heat exchanger 450 to allow the heat transfer fluid to circulate and move back and forth through the first magnetic regenerator 410, the second magnetic regenerator 420, the high temperature heat exchanger 440 and the low temperature heat exchanger 450. The magnetic cooling apparatus 40 includes a pump 470 to cause the heat transfer fluid to flow, a valve unit 480 arranged between the first magnetic regenerator 410 and the second magnetic regenerator 420 and the low temperature heat exchanger 450 to allow the heat transfer fluid that has transferred heat to one of the first magnetic regenerator 410 and the second magnetic regenerator 420 released from the magnetic field of the magnet 430 to flow into the low temperature heat exchanger 450, a third valve 475 arranged between the first magnetic regenerator 410 and the second magnetic regenerator 420 and the high temperature heat exchanger 440 to allow the heat transfer fluid that has received heat from one of the first magnetic regenerator 410 and second magnetic regenerator 420 subject to the magnetic field of the magnet 430 to flow into the high temperature heat exchanger 440.

The third valve 475 may be provided with a valve, e.g., a 4 Port-2 Position valve to divert the direction of flow of the heat transfer fluid caused by the pump 470. If a magnetic field is applied to the first magnetic regenerator 410 as illustrated in FIG. 7, the heat transfer fluid is allowed to pass through the first magnetic regenerator 410 and flow into the high temperature heat exchanger 440. If the magnetic field is applied to second magnetic regenerator 420 as illustrated in FIG. 8, the heat transfer fluid is allowed to pass through the second magnetic regenerator 420 and flow into the high temperature heat exchanger 440.

The valve unit 480 may be provided with a valve, e.g., a 4 Port-2 Position valve to allow the heat transfer fluid to pass through the first magnetic regenerator 410 or the second magnetic regenerator 420 and flow into the low temperature heat exchanger 450. Regardless of which of the first magnetic regenerator 410 and the second magnetic regenerator 420 is subject to the magnetic field of the magnet 430, the heat transfer fluid is set to flow counterclockwise via the valve unit 480 to pass through the low temperature heat exchanger 450.

When the heat transfer fluid flows into the low temperature heat exchanger 450 via the valve unit 480, it is arranged to circulate along a different flow path. Therefore, arranging the valve unit 480 within the effective heat exchange distance (S) allows effective heat exchange to occur even when the low temperature heat exchanger 450 is not disposed within the effective heat exchange distance (S). Here, arrangement of the valve unit 480 within the effective heat exchange distance (S) implies that the distance of flow of the heat transfer fluid between the outlet 414 of the first magnetic regenerator 410 and the outlet 480*b* of the valve unit 480 should be equal to, or less than, the effective heat exchange distance (S), and the distance of flow of the heat transfer fluid between the outlet 424 of the second magnetic regenerator 420 and the outlet 480*b* of the valve unit 480 should be equal to or less than the effective heat exchange distance (S). The distance of flow of the heat transfer fluid between the outlet 414 of the first magnetic regenerator 410 and the outlet 480*b* of the valve unit 480 is the sum of the length (S1) of a portion of the pipe 460 connecting the outlet 414 of the first magnetic regenerator 410 to the inlet 480*a* of the valve unit 480, and the length (S2) of flow of the heat transfer fluid through the valve unit 480 between the inlet 480*a* and outlet 480*b* of the valve unit 480. The distance of flow of the heat transfer fluid between the outlet 424 of the second magnetic regenerator 420 and the outlet 480*b* of the valve unit 480 is the sum of the length (S1) of a portion of the pipe 460 connecting the outlet 424 of the second magnetic regenerator 420 and the inlet 480*a* of the valve unit 480, and the length (S2) of flow of the heat transfer fluid through the valve unit 480 between the inlet 480*a* and outlet 480*b* of the valve unit 480.

FIGS. 7 and 8 illustrate an exemplary embodiment that includes two magnetic regenerators 410 and 420, but the number of magnetic regenerators 410 and 420 is not limited thereto. That is, at least one magnetic regenerator 410 and 420 may be provided to perform magnetic cooling. Likewise, the numbers of the high temperature heat exchangers 440 and valve units 480 to be provided are not limited.

As the low temperature heat exchanger 450 may be installed without regard to the effective heat exchange distance (S), the installability and convenience thereof is enhanced.

As is apparent from the above description, a heat exchange unit according to an exemplary embodiment of the present invention may be disposed within an effective heat exchange distance at which the heat transfer fluid effectively performs heat exchange when it reaches the heat exchange unit after receiving heat from or transferring heat to a magnetic regenerator, and therefore it may be possible to maintain the performance of a magnetic cooling apparatus above a certain level.

By disposing a valve unit within the effective heat exchange distance, it may be possible to dispose the heat exchange unit beyond the effective heat exchange distance.

Although a few embodiments of the present invention have been illustrated and described, it would be appreciated by those skilled in the art that changes may be made in these embodiments without departing from the principles and spirit of the invention, the scope of which is defined in the claims and their equivalents.

What is claimed is:

1. A magnetic cooling apparatus comprising:
a first magnetic regenerator and a second magnetic regenerator configured to allow a heat transfer fluid to pass therethrough and provided with including a magnetocaloric material;
a magnet configured to apply a magnetic field to the first magnetic regenerator and the second magnetic regenerator;
at least one high temperature heat exchanger configured to allow heat to be dissipated by the heat transfer fluid containing heat received from one of the first magnetic regenerator and the second magnetic regenerator subject to the magnetic field of the magnet applied thereto;
at least one low temperature heat exchanger system configured to allow heat to be absorbed by the heat transfer fluid that has transferred heat to one of the first magnetic regenerator and the second magnetic regenerator from which the magnetic field of the magnet has been removed;
a pipe to connect connecting the first magnetic regenerator, the second magnetic regenerator, the high temperature heat exchanger and the low temperature heat exchanger system such that a circulating heat transfer fluid circulates through the first magnetic regenerator, the second magnetic regenerator, the high temperature heat exchanger and the low temperature heat exchanger system;
a fluid transport unit configured to circulate or to reciprocate the heat transfer fluid through the pipe;
a valve unit arranged between the first magnetic regenerator and the second magnetic regenerator and the low temperature heat exchanger system and configured to guide a flow of the heat transfer fluid that has transferred heat to one of the first magnetic regenerator and the second magnetic regenerator from which the magnetic field of the magnet has been removed into the low temperature heat exchanger system,
wherein the valve unit includes:
a first valve arranged between the first magnetic regenerator and the low temperature heat exchanger system to guide flow of the heat transfer fluid that has transferred heat to the first magnetic regenerator into the low temperature heat exchanger system if the magnetic field is applied to the first magnetic regenerator, and
a second valve arranged between the second magnetic regenerator and the low temperature heat exchanger system to guide flow of the heat transfer fluid that has transferred heat to the second magnetic regenerator into the low temperature heat exchanger system if the magnetic field is applied to the second magnetic regenerator, and
wherein the low temperature heat exchanger system includes:
a first low temperature heat exchanger adapted to receive the heat transfer fluid flowing thereinto via the first valve, and
a second low temperature heat exchanger adapted to receive the heat transfer fluid flowing thereinto via the second valve.

2. The magnetic cooling apparatus according to claim 1, wherein the heat transfer fluid is selectively directed into the first low temperature heat exchanger or the second low temperature heat exchanger by the first valve and the second valve.

3. The magnetic cooling apparatus according to claim 2, wherein the fluid transport unit is adapted to:
circulate the heat transfer fluid in a first direction if the magnetic field of the magnet is applied to the first magnetic regenerator; and
circulate the heat transfer fluid in a second direction opposite to the first direction if the magnetic field of the magnet is applied to the second magnetic regenerator.

4. The magnetic cooling apparatus according to claim 1, wherein the high temperature heat exchanger and the low temperature heat exchanger system are disposed at opposite positions in a circulation path of the heat transfer fluid with the first magnetic regenerator and the second magnetic regenerator arranged therebetween.

5. The magnetic cooling apparatus according to claim 1, wherein the valve unit is a 3-way valve.

6. The magnetic cooling apparatus according to claim 1, wherein the at least one high temperature heat exchanger includes:
- a first high temperature heat exchanger, the heat transfer fluid flowing thereinto after receiving heat from the first magnetic regenerator; and
- a second high temperature heat exchanger, the heat transfer fluid flowing thereinto after receiving heat from the second magnetic regenerator.

7. The magnetic cooling apparatus according to claim 1, further comprising at least one third valve arranged between the first and second magnetic regenerators and the high temperature heat exchanger to allow flow of the heat transfer fluid containing heat received from one of the first magnetic regenerator and the second magnetic regenerator subject to the magnetic field of the magnet into the high temperature heat exchanger.

* * * * *